United States Patent [19]
Gallant

[11] Patent Number: 6,092,775
[45] Date of Patent: Jul. 25, 2000

[54] BEVERAGE CUP HOLDER WITH AN ACTUATOR

[76] Inventor: David Gallant, P.O. Box 10283, Portland, Me. 04104

[21] Appl. No.: 08/925,127

[22] Filed: Sep. 8, 1997

[51] Int. Cl.⁷ ...................................................... A47K 1/08
[52] U.S. Cl. ........................................ 248/311.2; 224/926
[58] Field of Search ................................. 248/311.2, 160; 224/926, 282, 539, 553; 220/259, 531, 908.1

[56] References Cited

U.S. PATENT DOCUMENTS

| | | | |
|---|---|---|---|
| 4,842,174 | 6/1989 | Sheppard et al. | 248/160 X |
| 4,942,990 | 7/1990 | White | 224/926 X |
| 5,839,711 | 11/1998 | Bieck et al. | 248/311.2 X |
| 5,921,519 | 7/1999 | Dexter et al. | 248/311.2 |

FOREIGN PATENT DOCUMENTS 10-236209  2/1997  Japan .

*Primary Examiner*—Ramon O. Ramirez
*Attorney, Agent, or Firm*—Frederick R. Cantor, Esq.

[57] ABSTRACT

A beverage cup holder can be adjustably positioned alongside a front seat of an automotive vehicle, to hold a beverage container in an accessible position near a person seated on the front seat. The beverage cup holder comprises a cup-gripper mechanism for stabilizing various size cups in the holder.

6 Claims, 3 Drawing Sheets

BEVERAGE CUP HOLDER WITH AN ACTUATOR

BACKGROUND OF THE PRESENT INVENTION

SUMMARY OF THE PRESENT INVENTION

This invention relates to a beverage cup holder, and especially a beverage cup holder adapted for installation in an automotive vehicle, e.g. a car or truck.

The beverage cup holder is preferably capable of holding various different size beverage cups, e.g. a coffee mug, soft drink can, small plastic cup, or large plastic cup. The aim is to provide a cup holder that does not require one specific size cup (container), whereby the user is not required to allocate a particular container for use in the cup holder.

In preferred practice of the invention the beverage cup holder is equipped with plural slots adapted to store audio tape casettes or compact discs, whereby the user can play recordings on the cassette player or disc player in the vehicle. The beverage cup holder is installable in the vehicle alongside the driver's seat and/or alongside the front passenger's seat, such that the beverage cup and tape cassettes are within easy reach of the driver or front seat passenger.

The invention includes an adjustable mounting mechanism for the cup holder, whereby the user can shift the cup holder limited distances in accordance with the available space and user convenience. Different vehicles have slightly different arrangements of the dashboard, front seats, and console between the front seats. The adjustable mounting mechanism of the present invention adapts the beverage cup holder to various different vehicle designs while still giving the user some range of adjustment to a convenient position wherein he or she can reach the beverage cup without uncomfortably twisting or bending the wrist or arm.

In vehicles equipped with a center console between the driver's seat and front passenger seat the console mounts the parking brake handle and drive transmission selector lever. The console is thus relatively large, leaving only a relatively small vacant space between the console and the leg of the vehicle occupant. This results in a relatively small space available for a beverage cup holder. The present invention contemplates an elongated flexible conduit as a mounting mechanism for the beverage cup holder. The flexible conduit can be bent and flexed to adjustably position the cup holder in a range of different locations proximate to the vehicle seat.

The invention contemplates a beverage cup holder that can be constructed as a relatively small size appliance suitable for disposition in relatively small clearance spaces commonly found in automotive vehicles. The beverage cup holder preferably includes an adjustable gripper mechanism designed to hold a range of different size beverage containers without tipping or bouncing out of the holder. The capability of the holder to adjust to different size containers enables the cup holder to be constructed as a small size device, since there is no need for providing multiple different-size cup holder openings that would necessarily increase the overall dimensions of the cup holder.

Also, as previously noted, the cup holder includes an elongated flexible conduit mounting mechanism that enables the cup holder to take various different adjusted positions in the vehicle, in accordance with the available space and user preferences. The elongated flexible conduit can be formed of interlocking collars having hinging capabilities or a single strip of material wound helically to achieve conduit flexibility and mechanical stiffness. Such elongated flexible conduits are commonly used as housings for electrical wiring and as support mechanisms for desk lamps.

Specific features of the invention will be apparent from the attached drawings and description of an illustrative embodiment of the invention.

In summary, and in accordance with the above discussion, the foregoing objectives are achieved in the following embodiments.

1. A beverage cup holder adapted for installation in an automotive vehicle comprising:
   a tray having a bottom wall and upstanding side walls;
   a cover overlying said tray;
   a cup-accommodation opening in said cover; said opening having a central axis; and
   a cup-engagement gripper mechanism slidably positioned on said cover for movement toward or away from said central axis, whereby cups of varying diameter can be supported in the tray.

2. The beverage cup holder, as described in paragraph 1, wherein said cover has an upper surface and a lower surface; said gripper mechanism being slidably mounted for swinging movement along the cover upper surface.

3. The beverage cup holder, as described in paragraph 2, and further comprising a single actuator for said gripper mechanism; said actuator having a drive connection with said gripper mechanism, whereby movement of said actuator causes said gripper mechanism to move toward or away from said central axis.

4. The beverage cup holder, as described in paragraph 3, wherein said drive connection comprises a handle extending upwardly from said gripper mechanism.

5. The beverage cup holder, as described in paragraph 4, and further comprising a detent means carried by said gripper mechanism for releasably retaining said gripper mechanism in selected positions of adjustment.

6. The beverage cup holder, as described in paragraph 1, and further comprising plural audio tape cassette slots in said cover; said cover being spaced a lesser distance from the tray bottom wall than the width dimension of a tape cassette, whereby a tape cassette placed in any given slot projects above the plane of said cover so as to be readily accessed.

7. The beverage cup holder, as described in paragraph 6, wherein there are four tape cassette slots arranged symmetrically around said cup-accommodation opening.

8. The beverage cup holder, as described in paragraph 1, and further comprising an elongated flexible conduit extending from said tray, said flexible conduit having an end fitting adapted for attachment to an automotive seat, whereby said tray can be adjustably supported proximate to the seat.

9. The beverage cup holder, as described in paragraph 8, wherein said flexible conduit is attached to the tray bottom wall at a central point on said bottom wall.

10. A beverage cup holder for use in an automotive vehicle, comprising:
    a tray having a bottom wall and upstanding side walls;
    cover removably attached to said tray so as to overlie the tray bottom wall; said cover having an upper surface and a lower surface;
    means for removeably supporting said tray in an automotive vehicle, comprising an elongated flexible conduit extending from the tray bottom wall; said flexible conduit having an end fitting adapted for attachment to an automotive seat, whereby said tray can be moved limited distances while being supported alongside the seat;

said cover having a cup-accommodation opening that has a central vertical axis;

a cup-engagement mechanism slidably positioned on the upper surface of said cover for movement toward or away from said central axis, whereby cups of varying diameter can be supported in the tray;

an actuator extending upwardly from said cup-engagement mechanism for moving said mechanism; and a detent means for releasably holding said mechanism in selected positions of adjustment.

DESCRIPTION OF THE PREFERRED EMBODIMENTS OF THE PRESENT INVENTION

Figure 1:
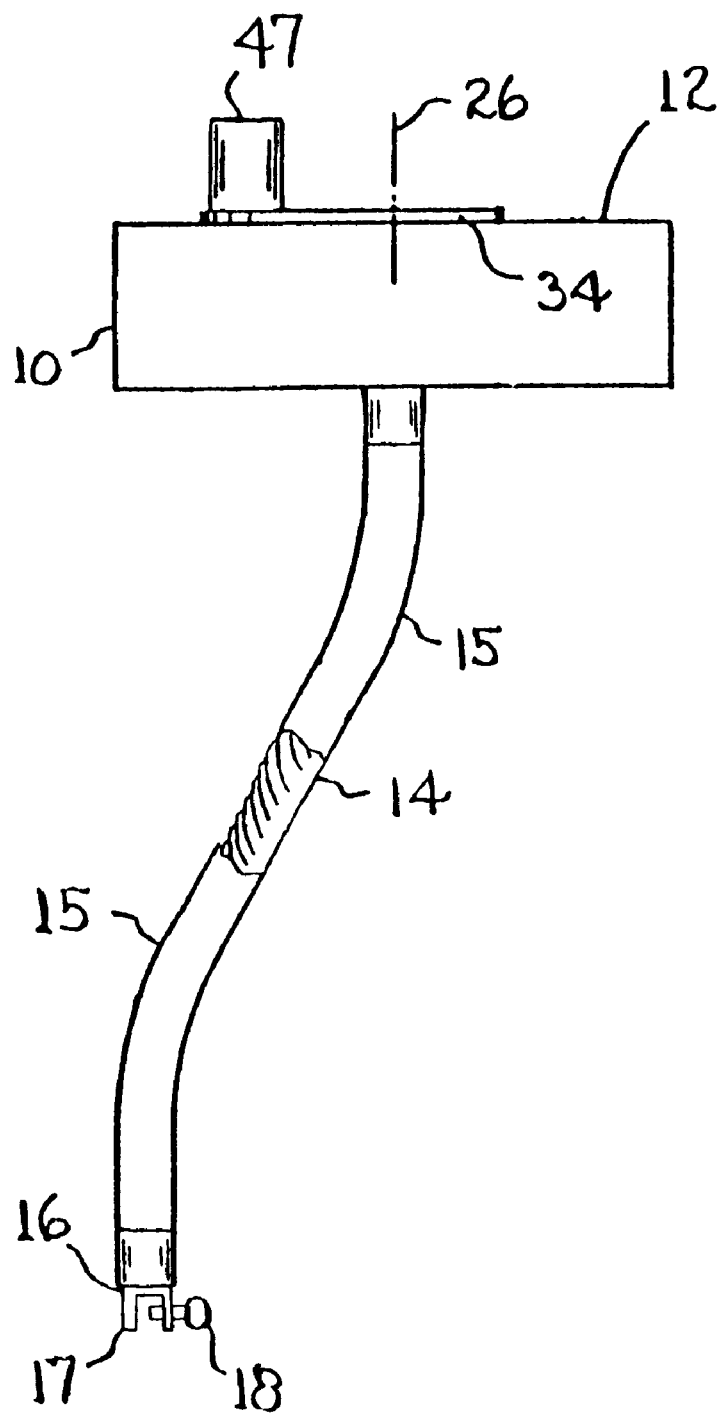
FIG. 1, is an elevational view, of a beverage cup holder and associated mounting mechanism constructed according to the invention.

Referring to the drawings, there is shown a beverage cup holder of this invention adapted for installation in an automotive vehicle, e.g. an automobile or truck. The cup holder is designed for use alongside the driver's seat and/or the front passenger seat.

FIG. 1, is an elevational view, of a beverage cup holder and associated mounting mechanism constructed according to the invention.

The illustrated beverage cup holder comprises a tray 10 having a cover 12, and an elongated flexible conduit 14 extending downwardly from the tray. The lower end of flexible conduit 14 has an end fitting 16 adapted for attachment to the frame portion of an automotive seat. As shown in the drawing, the end fitting 16 comprises a channel 17 attached to flexible conduit 14 and a thumb screw 18 threadably extending through one leg of the channel.

Flexible conduit 14 can be comprised of interlocking collars capable of hinging motions relative to one another; preferably the collar assembly is covered by a plastic sheathing 15.

In many vehicles each front seat is slidably mounted on a fixed track structure fastened to the vehicle floor. The forward end of the track structure is accessible for use as an anchorage for flexible conduit 14. Channel 17 can be positioned around the front end area of the fixed track structure, after which thumb screw 18 can be turned to clamp the conduit end fitting to the track structure.

In some vehicles the seat frame is available as an anchorage for end fitting 16. If conduit 14 is to be permanently affixed to the vehicle, the end fitting 16 can take the form of an angle bracket attached to flexible conduit 14, with an attachment hole in one leg of the bracket; a mounting screw can be extended through the attachment hole into the vehicle floor to rigidly affix the lower end of flexible conduit 14 to the vehicle. The lower end of conduit 14 is preferably located at floor level near the front corner of the vehicle seat proximate to the vehicle centerline. In vehicles equipped with a console between the driver's seat and the front passenger seat, the lower end of conduit 14 will be located alongside the console at floor level. Conduit 14 typically has a length of about fourteen inches, such that tray 10 can be raised or lowered, or shifted in a front-to-rear direction, in accordance with clearance considerations and the comfort of the user.

Tray 10 has to be located away from the person's body so as not to interfere with control of vehicle driver activities. At the same time, tray 10 has to be located reasonably close to the seat so as to be within easy reach of the driver or front seat passenger. Flexible conduit 14 enables tray 10 to be shifted to meet the different criteria. The conduit has the desired flexibility or bendability, while still being sufficiently stiff to hold tray 10 in a fixed location while the vehicle is being driven.

Figure 2:
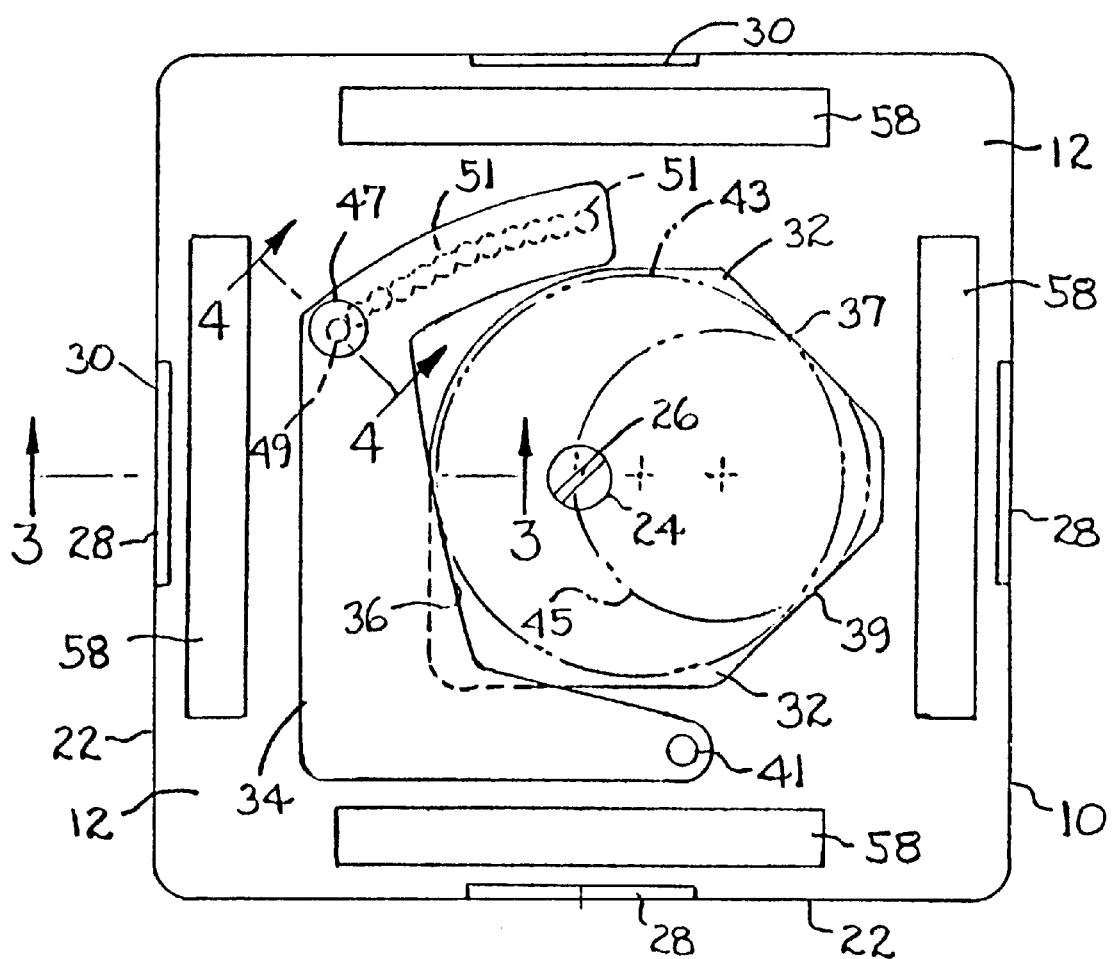
FIG. 2, is a top plan view, of the FIG. 1 beverage cup holder.

FIG. 2, is a top plan view, of the FIG. 1 beverage cup holder.

Figure 3:
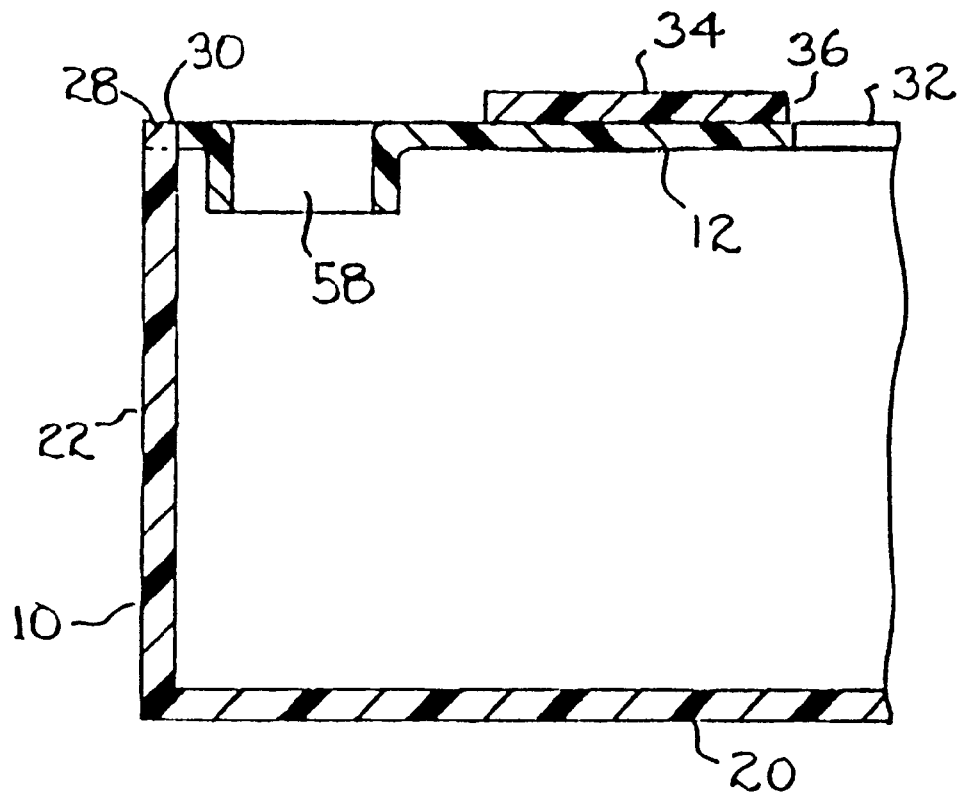
FIG. 3, is an enlarged fragmentary sectional view, taken on line 3—3 in FIG. 2.

FIG. 3, is an enlarged fragmentary sectional view, taken on line 3—3 in FIG. 2.

Tray 10 comprises a bottom wall 20 and four upstanding side walls 22. A flat head screw 24 can be extended through bottom wall 20 into a threaded hole in the upper end of flexible conduit 14, in order to rigidly attach the tray to the conduit. Screw 24 can be unthreaded from the conduit if it should become necessary to disconnect the tray from the conduit, e.g. should it be desired to clean the tray without removing conduit 14 from its installed position. Screw 24 is preferably located on the central vertical axis 26 of the tray, such that the weight of the tray is distributed equally onto the flexible conduit along the conduit axis, as shown in FIG. 1. The conduit can however be flexed or bent for adjusting the tray location.

Cover 12 is detachably connected to tray 10, to facilitate cleaning of the tray undersurface and tray interior surfaces. Various connecting mechanisms can be used between the cover and the tray, e.g. a hinged connection, or screw connections. As shown in the drawing, the detachable connection between the cover and the tray comprises four rectangular lugs or tabs 28 extending upwardly from the tray side walls 22 into mating notches 30 in the edges of cover 12. The tabs frictionally hold the cover in place on the tray, while permitting the cover to be removed, e.g. for cleaning purposes.

Cover 12 has a central beverage cup-accommodation opening 32 located generally on the tray vertical axis 26. A beverage cup or container (not shown) can be placed in opening 32 so as to rest on the tray bottom wall 20. The beverage cup will extend above the plane of cover 12 so as to be accessible for easy removal from the beverage holder. Typically, the depth dimension of tray 10 will be about two inches.

In order to prevent the beverage cup from tipping or bouncing out of the holder it is necessary that the cup fit snugly within the holder. If the holder is to accommodate a range of different size (diameter) containers, the opening 32 will not be sufficient to retain all of the desired cup sizes, with the desired stability.

The illustrated cup holder comprises a cup-engagement gripper plate 34 slidably mounted on the upper surface of cover 12. Gripper plate 34 has an inner edge 36 facing edge areas 37 and 39 of opening 32, whereby a beverage cup can be supported (or stabilized) with side surfaces thereof engaged against the three edges 36, 37 and 39.

Gripper plate 34 is swingably mounted on a pivot 41 extending from cover 12, whereby edge 36 of the plate can be moved toward or away from the axis of opening 32 in accordance with the size of beverage cup to be supported in tray 10. Numeral 43 illustrates the largest diameter beverage cup that can be supported. Various intermediate cup sizes can be accommodated, depending on the position of gripper plate 34.

Figure 4:
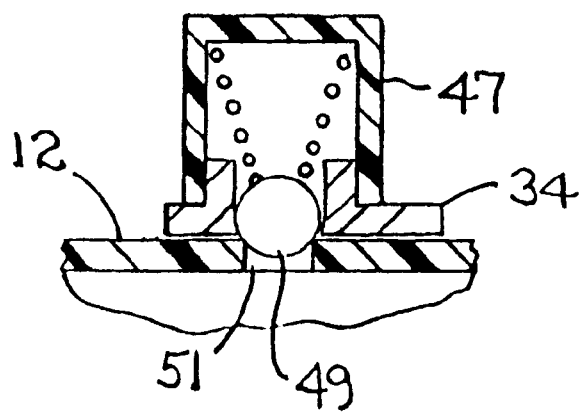
FIG. 4, is an enlarged fragmentary sectional view, taken on line 4—4 in FIG. 2.

FIG. 4, is an enlarged fragmentary sectional view, taken on line 4—4 in FIG. 2.

A cylindrical actuator handle 47 extends upwardly from gripper plate 34 to facilitate manual adjustment of the gripper plate. A spring-biased ball detent 49 is located within handle 47 for releasably holding gripper plate 34 in selected positions of adjustment. The ball detent registers with a row of circular openings, or depressions, 51 in cover 12, so as to releasably lock gripper plate 34 in selected positions, according to the size of the beverage cup placed in tray 10.

In preferred practice of the invention, the beverage cup holder has four audio tape cassette slots 58 symmetrically arranged around the central opening 32. Each slot 58 accommodates one audio tape cassette in an upright accessible position. The cassette rests edgewise on the tray bottom wall 20, with a portion of the cassette located above the plane of cover 12 for access purposes. In an alternate arrangement, not shown, slots 58 are sized to the dimensions of known compact discs. The slot 58 dimensions are related to the type of audio player in the vehicle, i.e. tape cassette or compact disc.

Depending on the size of the beverage cup holder, various depressions and pockets can be formed in cover 12 to accommodate coins, keys, and other items that a person might need while seated in the vehicle.

It will be seen that the drawings show a beverage cup holder of simplified design adapted to support various different diameter beverage containers. The cup-engagement gripper plate mechanism 34 can be moved by actuator 47 so as to conform to different container dimensions. The lock mechanism shown in FIG. 4 locks actuator 47 in any adjusted position.

The flexible mounting mechanism 14 enables the beverage cup holder to be adjusted laterally and vertically to accord with different user requirements.

Further, the inventor envisions an adaptation, i.e. an extension, to the preferred embodiment, utilizing one, or more, of the audio tape cassette slots 58. An extension plate, which is oriented horizontally, has a fixed opening designed to hold an additional beverage cup, and an insert section that may be inserted into one of the tape cassette slots 58. The insert section of the extension plate, is vertically aligned, and is oriented at a right-angle to the horizontal extension plate.

The present invention, described above, relates to a beverage cup holder. Features of the present invention are recited in the appended claims. The drawings contained herein necessarily depict structural features and embodiments of the beverage cup holder, useful in the practice of the present invention.

However, it will be appreciated by those skilled in the arts pertaining thereto, that the present invention can be practiced in various alternate forms, proportions, and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A beverage cup holder for holding different size beverage containers against tipping or bouncing, said beverage cup holder adapted for use in a vehicle, said beverage cup holder comprising:

a tray having a bottom wall;

a cover overlying said tray, said cover having an upper surface and a lower surface;

a cup-accommodation opening in said cover for receiving a beverage cup therein, said opening having a central axis;

a cup-engaging gripper mechanism positioned on said upper surface of said cover for slidable movement in respect thereto toward or away from said central axis, whereby cups of varying diameter supported in said tray can be held therein;

a detent means operative between said gripper mechanism and said cover for holding the gripper mechanism in place while engaging a beverage cup; and a single actuator for said gripper mechanism; said actuator having a drive connection with said gripper mechanism, whereby movement of said actuator causes said gripper mechanism to move toward or away from said central axis.

2. The beverage cup holder, as described in claim 1, and further comprising plural audio tape cassette slots in said cover; said cover being spaced a lesser distance from the tray bottom wall than the width dimension of a tape cassette, whereby a tape cassette placed in any given slot projects above the plane of said cover so as to be readily accessed.

3. The beverage cup holder, as described in claim 2, wherein there are four tape cassette slots arranged symmetrically around said cup-accommodation opening.

4. The beverage cup holder, as described in claim 1, wherein said drive connection comprises a handle extending upwardly from said gripper mechanism.

5. The beverage cup holder, as described in claim 1, and further comprising a detent means carried by said gripper mechanism for releasably retaining said gripper mechanism in selected positions of adjustment.

6. A beverage cup holder for use in an automotive vehicle, comprising:

a tray having a bottom wall and upstanding side walls;

cover removably attached to said tray so as to overlie the tray bottom wall; said cover having an upper surface and a lower surface;

means for removeably supporting said tray in an automotive vehicle, comprising an elongated flexible conduit extending from the tray bottom wall; said flexible conduit having an end fitting adapted for attachment to an automotive seat, whereby said tray can be moved limited distances while being supported alongside the seat;

said cover having a cup-accommodation opening that has a central vertical axis;

a cup-engagement mechanism slidably positioned on the upper surface of said cover for movement toward or away from said central axis, whereby cups of varying diameter can be supported in the tray;

an actuator extending upwardly from said cup-engagement mechanism for moving said mechanism; and a detent means for releasably holding said mechanism in selected positions of adjustment.

* * * * *